UNITED STATES PATENT OFFICE.

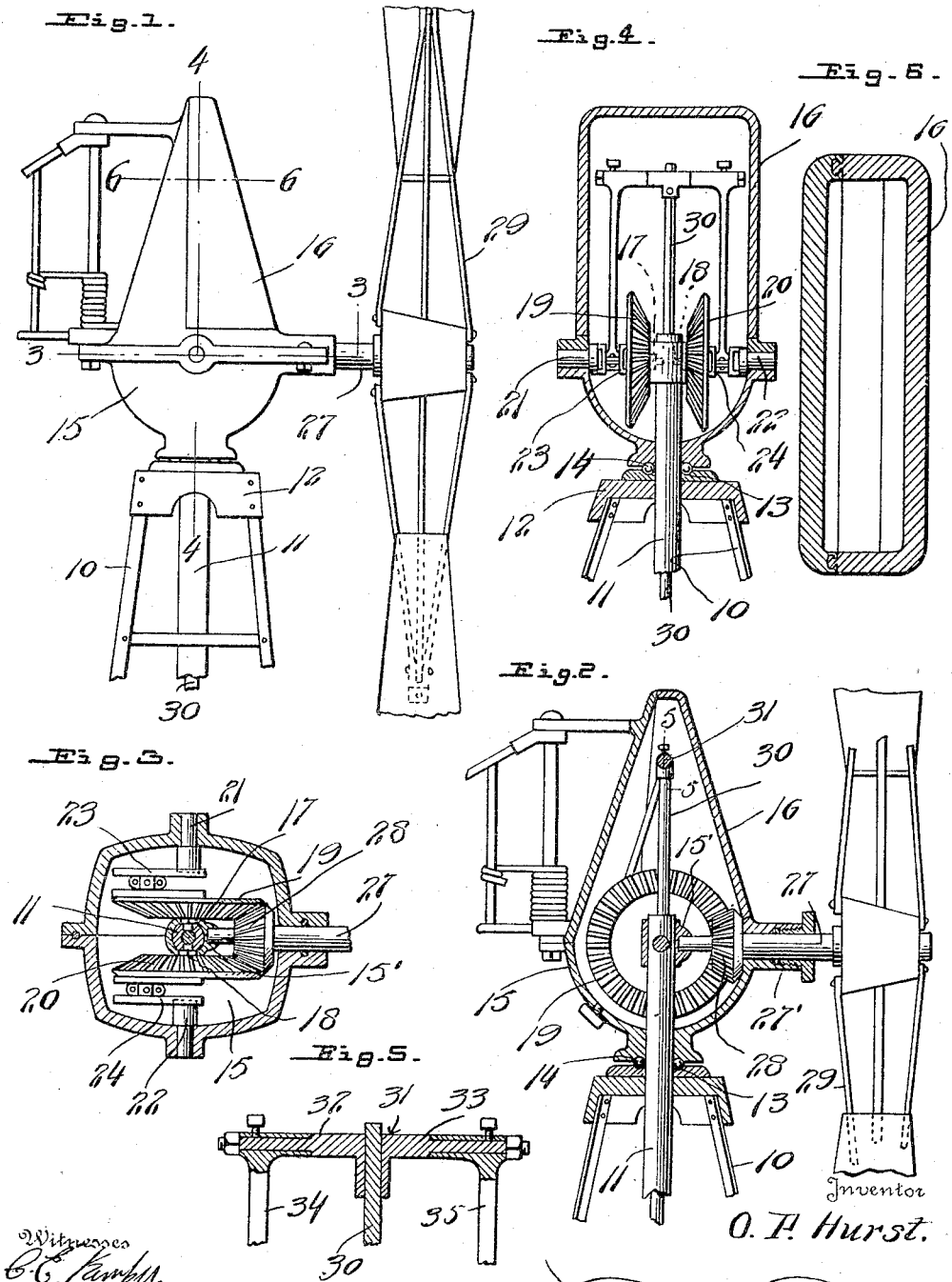

OLIVER P. HURST, OF MUTUAL, OKLAHOMA.

GEARING FOR WINDMILLS.

1,205,896.     Specification of Letters Patent.     Patented Nov. 21, 1916.

Application filed October 26, 1914. Serial No. 868,758.

*To all whom it may concern:*

Be it known that I, OLIVER P. HURST, a citizen of the United States, residing at Mutual, in the county of Woodward, State of Oklahoma, have invented certain new and useful Improvements in Gearing for Windmills; and I do hereby declare the following to be a full, clear, and exact description of the invention, such as will enable others skilled in the art to which it appertains to make and use the same.

This invention relates to gearing for windmills.

The object of the invention resides in the provision of a gearing for windmills embodying an improved construction designed to utilize and control the power derived from the revolution of the wind-wheel in such a way that no power will be lost and so that the entire revolution of the wheels will be active in lifting the liquid being pumped.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of a windmill embodying the improved gearing; Fig. 2, a vertical section of what is shown in Fig. 1 with the wind-wheel and its shaft in elevation; Fig. 3, a section on the line 3—3 of Fig. 1 with the gearing in elevation; Fig. 4, a section on the line 4—4 of Fig. 1; Fig. 5, a section on the line 5—5 of Fig. 2, and Fig. 6, a section on the line 6—6 of Fig. 1.

Referring to the drawings 10 indicates the tower of the windmill and 11 a tubular pump rod guide which has secured thereto a head plate 12, said plate being in turn attached to the tower 10. Formed on the upper end of the plate 12 and surrounding the tubular member 11 is a bearing race 13 in which is disposed a plurality of ball bearings 14. Rotatably mounted upon the tubular member 11 and supported upon the ball bearings 14 is a casing 15 provided with a removable portion 16 whereby access to the interior of the casing may be had when desired. Projecting laterally from the tubular member 11 within the casing 15 at diametrically opposite points on said tubular member are stub shafts 17 and 18 and rotatably mounted on the shafts 17 and 18 respectively are beveled gears 19 and 20. Rotatably mounted in opposite sides of the casing 15 and in longitudinal alinement with the shafts 17 and 18 are shafts 21 and 22. Detachably mounted upon the outer sides of the gears 19 and 20 are H-shaped blocks 23 and 24 respectively the outer portions of which are connected at one end in a suitable manner to the shafts 21 and 22. Rotatably mounted in a thrust bearing 15′ and in the casing 15 at right angles to the shafts 17 and 18 is a shaft 27 which has fixed on its inner end a pinion 28 meshing with the gears 19 and 20. The outer portion of this shaft 27 is encircled by a packing nut 27′ threaded in the casing 15. Fixed on the outer end of the shaft 27 is a wind-wheel 29. Slidably mounted in the tubular member 11 is the usual pump rod 30 the upper end of which is connected to a cross head 31 including arms 32 and 33. The arm 32 is connected to the cross member of the block 23 by a connecting rod 34, while the arm 33 is connected to the cross member of the block 24 by means of a connecting rod 35. By reversing the positions of the H-shaped blocks from that shown in Fig. 3 it will be obvious that the length of the stroke can be changed. By this construction it will be apparent that when the wind-wheel 29 is rotated the shaft 27 will also be rotated and owing to the engagement of the pinion 28 with the gears 19 and 20 it will be further obvious that the said gears will be rotated in opposite directions and effect reciprocation of the pump rod 30.

What is claimed is:—

In a windmill, the combination of a casing, opposed beveled gears rotatably mounted in said casing, a wind-wheel shaft rotatably mounted in the casing, a pinion on said shaft meshing with said gears, a reciprocating pump rod having its upper end disposed in said casing, a cross head secured to the upper end of the pump rod, stub shafts rotatably supported by the casing, blocks having wrist pins, the sides of said blocks being adjustably connected with the stub shafts and bevel gears, and connecting rods between respective wrist pins and the cross head.

In testimony whereof I affix my signature, in the presence of two witnesses.

OLIVER P. HURST.

Witnesses:
GRAYCE COMPTON,
J. S. EARLE.